(12) United States Patent
Wei et al.

(10) Patent No.: US 8,614,581 B2
(45) Date of Patent: *Dec. 24, 2013

(54) VACUUM IONIZATION GAUGE

(75) Inventors: Yang Wei, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 339 days.

This patent is subject to a terminal disclaimer.

(21) Appl. No.: 13/091,126

(22) Filed: Apr. 21, 2011

(65) Prior Publication Data

US 2012/0169347 A1 Jul. 5, 2012

(30) Foreign Application Priority Data

Dec. 31, 2010 (CN) .......................... 2010 1 0618202

(51) Int. Cl.
*G01L 21/34* (2006.01)

(52) U.S. Cl.
USPC ........... 324/460; 324/459; 324/464; 313/309; 313/311; 313/351; 313/495

(58) Field of Classification Search
USPC ........... 324/459, 460, 462, 464; 977/743, 939
See application file for complete search history.

(56) References Cited

U.S. PATENT DOCUMENTS

| | | | | |
|---|---|---|---|---|
| 6,498,424 B1* | 12/2002 | Saito et al. | ..................... | 313/309 |
| 7,049,823 B2* | 5/2006 | Correale | ....................... | 324/460 |
| 7,129,708 B1* | 10/2006 | Liu et al. | ....................... | 324/464 |
| 7,141,983 B2* | 11/2006 | Liu et al. | ....................... | 324/460 |
| 7,652,418 B2* | 1/2010 | Choi et al. | ..................... | 313/497 |
| 7,863,806 B2* | 1/2011 | Wei et al. | ....................... | 313/495 |
| 7,868,531 B2* | 1/2011 | Liang | ............................. | 313/336 |
| 8,106,576 B1* | 1/2012 | Wei et al. | ....................... | 313/495 |
| 8,319,415 B2* | 11/2012 | Wei et al. | ....................... | 313/496 |
| 8,368,295 B2* | 2/2013 | Wei et al. | ....................... | 313/495 |
| 8,395,309 B2* | 3/2013 | Wei et al. | ....................... | 313/496 |
| 8,450,920 B2* | 5/2013 | Wei et al. | ....................... | 313/496 |
| 2004/0095050 A1* | 5/2004 | Liu et al. | ....................... | 313/309 |
| 2009/0115309 A1* | 5/2009 | Wei et al. | ....................... | 313/495 |
| 2009/0134127 A1* | 5/2009 | Wei et al. | ..................... | 219/121.21 |
| 2011/0038465 A1* | 2/2011 | Mahapatra | .................... | 378/143 |
| 2011/0101846 A1* | 5/2011 | Wei et al. | ....................... | 313/311 |
| 2012/0133270 A1* | 5/2012 | Wei et al. | ....................... | 313/498 |

FOREIGN PATENT DOCUMENTS

| | | | | |
|---|---|---|---|---|
| JP | 2001176378 A | * | 6/2001 | ............. H01J 1/304 |
| TW | 200605129 | | 2/2006 | |
| TW | 200921739 | | 5/2009 | |

* cited by examiner

*Primary Examiner* — Jermele M Hollington
*Assistant Examiner* — James Split
(74) *Attorney, Agent, or Firm* — Altis Law Group, Inc.

(57) ABSTRACT

A vacuum ionization gauge includes a cold cathode, a shield electrode, an anode ring, and a collector. The shield electrode includes a receiving space. The anode ring is located in the receiving space of the shield electrode. The cold cathode includes a field emission unit and a grid electrode corresponding to the field emission unit. The field emission unit includes at least one emitter. Each of the at least one emitter includes a carbon nanotube pipe. The carbon nanotube pipe has a first end, a second end, and a main body connecting to the first end and the second end. The second end has a plurality of carbon nanotube peaks.

20 Claims, 8 Drawing Sheets

VACUUM IONIZATION GAUGE

CROSS-REFERENCE TO RELATED APPLICATIONS

This application claims all benefits accruing under 35 U.S.C. §119 from China Patent Application No. 201010618202.4, filed on Dec. 31, 2010 in the China Intellectual Property Office, disclosure of which is incorporated herein by reference.

BACKGROUND

1. Technical Field

The present disclosure relates to a vacuum ionization gauge.

2. Description of Related Art

Nowadays, high vacuum conditions are employed in many technological fields, such as simulation technology in aerospace, superconductor technology, nuclear fusion technology, ultra-low temperature technology, and large particle accelerator technology. Vacuum gauges for measuring pressure in ultra-high and extremely high vacuum conditions are needed.

A typical example is shown and discussed in U.S. Pat. No. 7,129,708, entitled, "VACUUM IONIZATION GAUGE WITH HIGH SENSITIVITY" issued to Fan, et al. on Oct. 31, 2006. This patent discloses a vacuum ionization gauge. However, during the use of the vacuum ionization gauge, a high positive voltage needs to be applied to the grid electrode because the field emission array is made of metal, nonmetal, compound, or other nanometer materials which has a relatively poor electron emission characteristic, which will result in the grid electrode attracting the electrons into the shield electrode. The grid electrode catches the electrons in the shield electrode so that the route of the electron in the shield electrode is short. Therefore, the electrons cannot collide with the gas molecules to ionize the gas molecules, and the sensitivity of the vacuum ionization gauge is low.

What is needed, therefore, is a vacuum ionization gauge which has improved sensitivity.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

References will now be made to the drawings to describe, in detail, various embodiments of the present vacuum ionization gauge.

Figure 1:
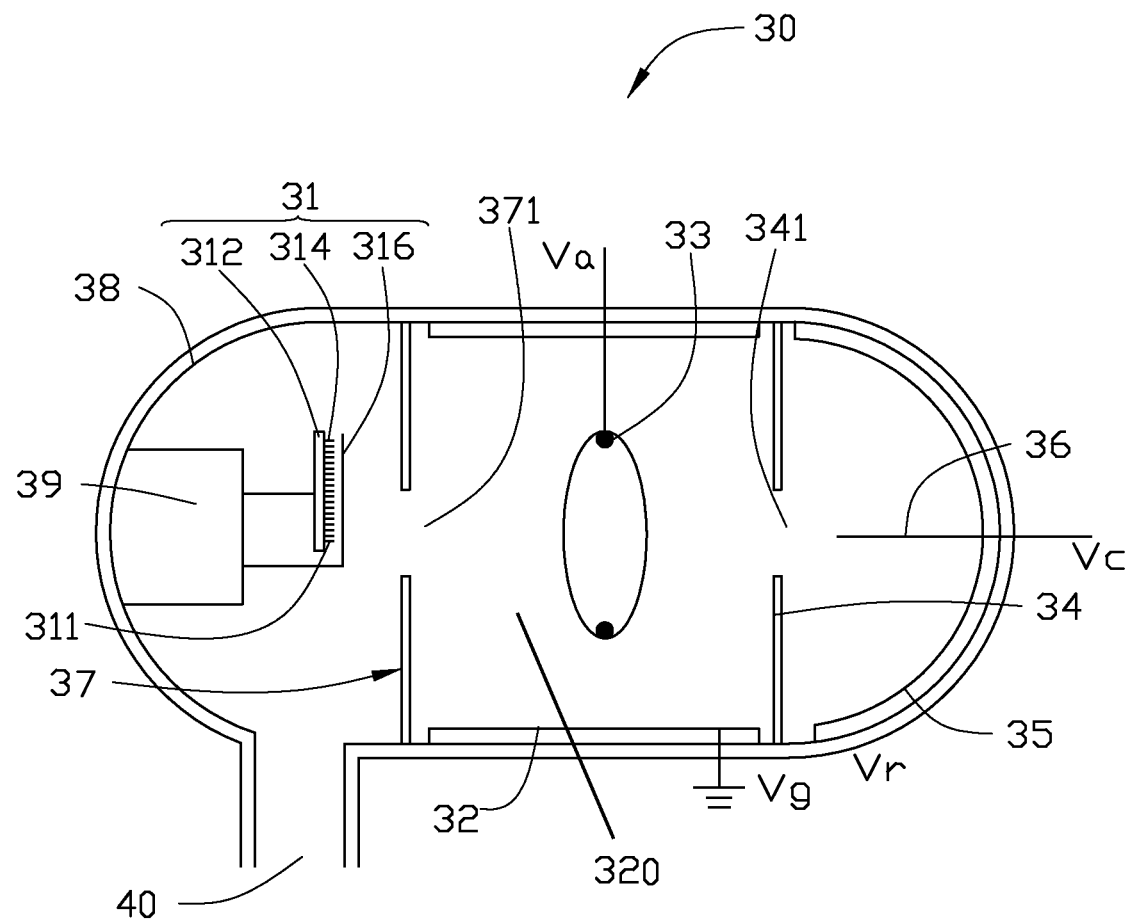
FIG. 1 is a sectional view of one embodiment of a vacuum ionization gauge.
Figure 2:
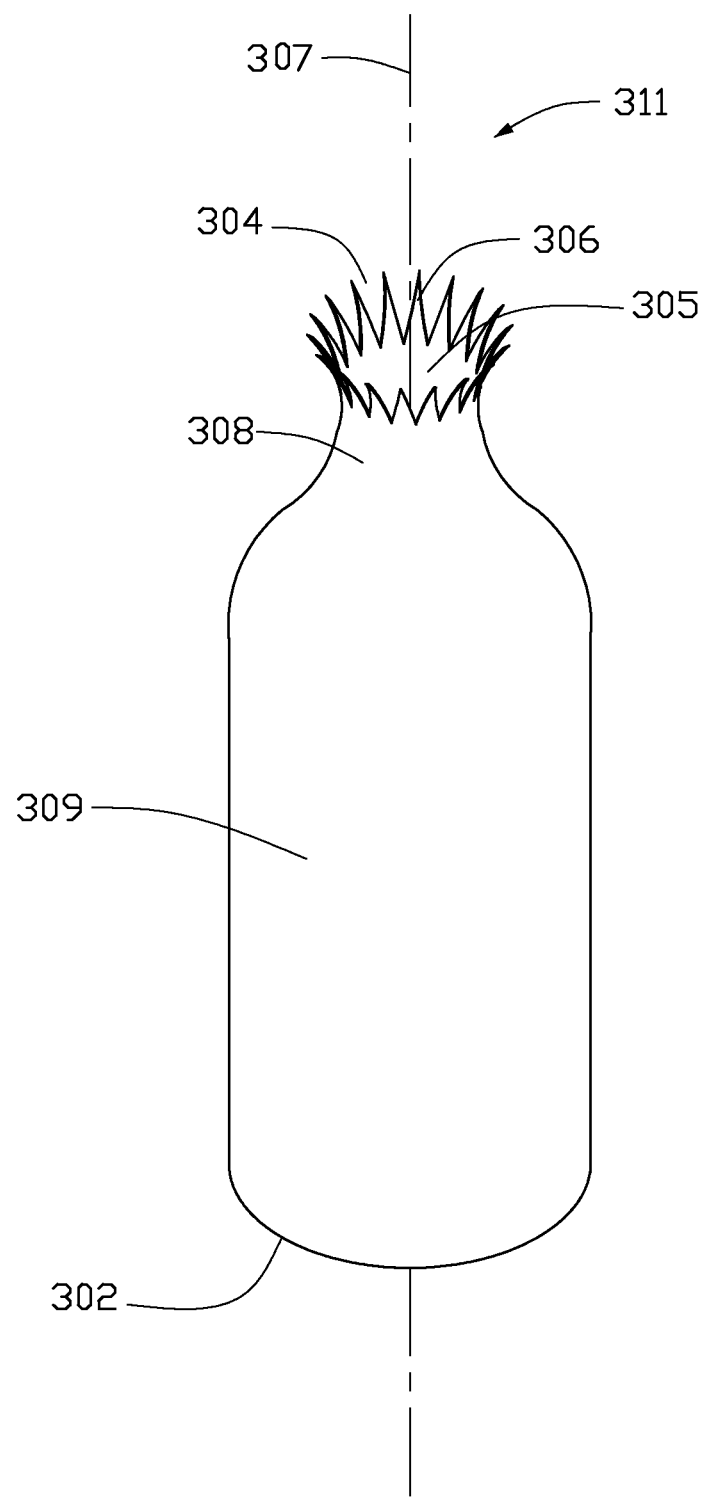
FIG. 2 is an isometric view of an electron emitter used in the vacuum ionization gauge of FIG. 1.
Figure 3:
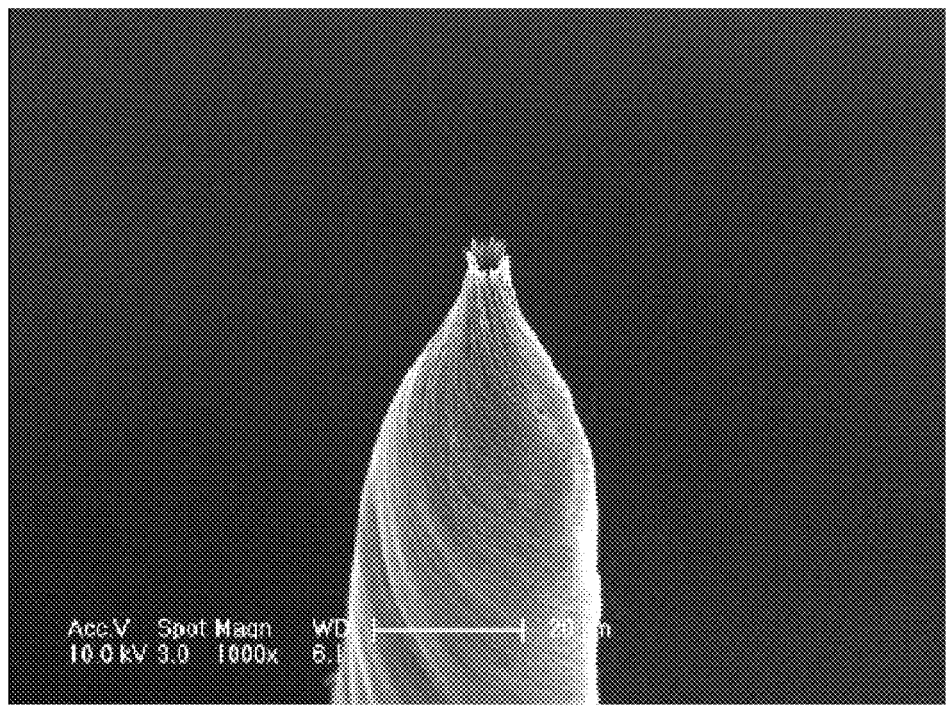
FIG. 3 is a Scanning Electron Microscope (SEM) image of one embodiment of an electron emitter of FIG. 2.
Figure 4:
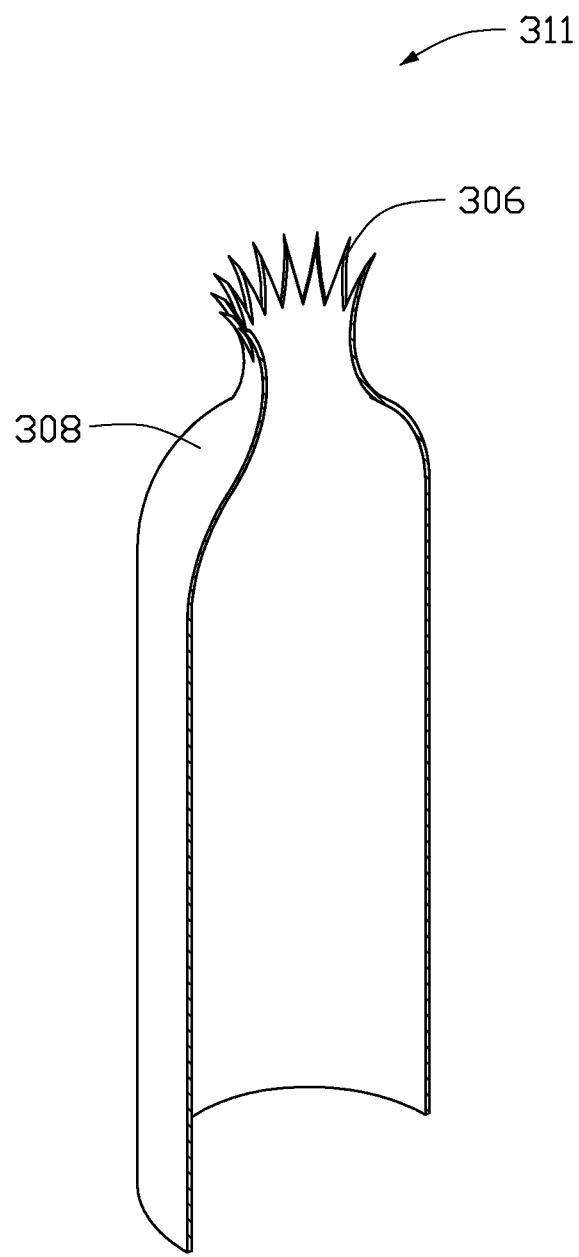
FIG. 4 is a cross-sectional view along an axial direction of FIG. 2.
Figure 5:
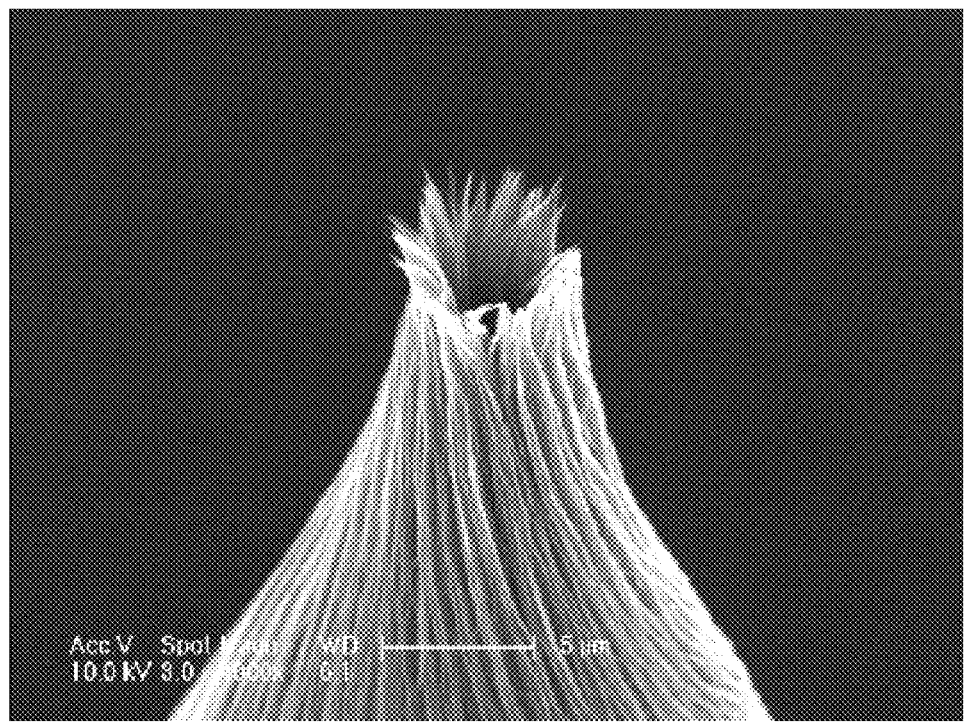
FIG. 5 is an SEM image of one embodiment of one end of an electron emitter.
Figure 6:
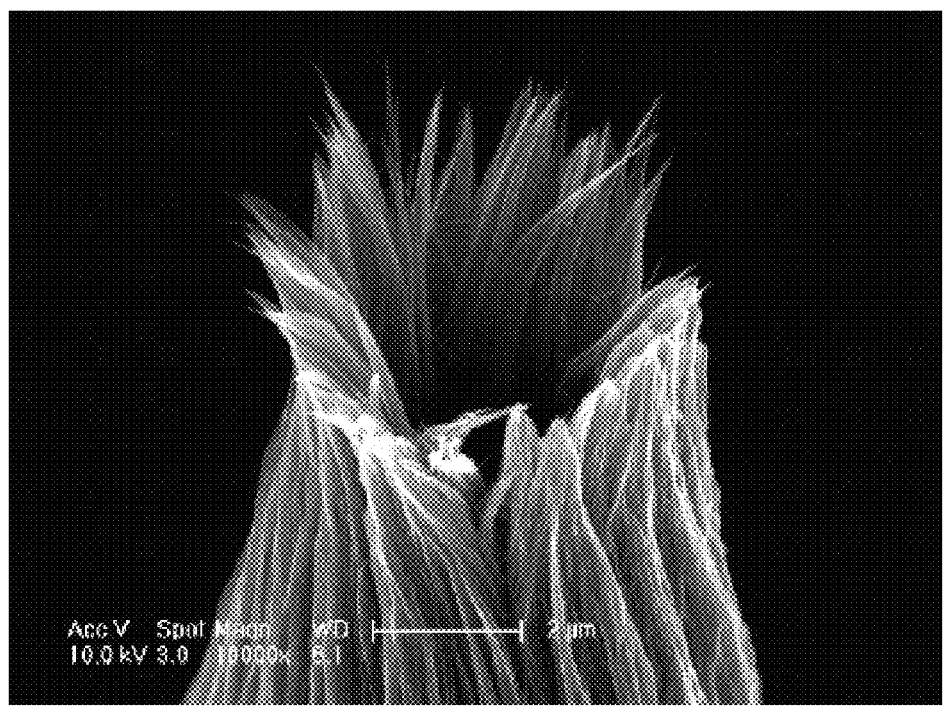
FIG. 6 is an SEM image of one embodiment of a number of carbon nanotube peaks of an electron emitter.

Referring to FIG. 1 and FIG. 2, a vacuum ionization gauge 30 is provided in one embodiment. The vacuum ionization gauge 30 includes a cold cathode 31, a shield electrode 32, an anode ring 33, an electron induct electrode 37, an ion educed electrode 34, and a fixture 39. The vacuum ionization gauge 30 can further include a reflector 35, a collector 36, and a shell 38 receiving the cold cathode 31, the shield electrode 32, the anode ring 33, the electron induct electrode 37, the ion educed electrode 34, the reflector 35, the collector 36, and the fixture 39. The shell 38 has an opening 40 connected to an object that needs to be measured.

The shield electrode 32 includes a first opening (not labeled), a second opening (not labeled), and a receiving space 320 communicating with the two openings. The cold cathode 31 is positioned near the first opening of the shield electrode 32 and the collector 36 is positioned near the second opening of the shield electrode 32. The cold cathode 31 can be fastened on one end of the shell 38 by the fixture 39. The electron induct electrode 37 is located between the cold cathode 31 and the shield electrode 32. An electron induct hole 371 is defined in a middle of the electron induct electrode 37. The ion educed electrode 34 is positioned between the shield electrode 32 and the collector 36. An ion educed hole 341 is defined in a middle of the ion educed electrode 34. The collector 36 can be positioned at a center of a curving surface of the reflector 35, and point toward the ion educed hole 341. The anode ring 33 is positioned in the receiving space 320 of the shield electrode 32.

The cold cathode 31 includes a substrate 312, a field emission unit 314 formed on the substrate 312, and a grid electrode 316 corresponding to the field emission unit 314. The field emission unit 314 is aimed at the electron induct hole 371. The field emission unit 314 includes a number of electron emitters 311. The electron emitters 311 can be substantially parallel to and spaced apart from each other, or cross each other. The electron emitters 311 can be pasted on the substrate 312 by conductive adhesive or van der Waals force. The grid electrode 316 has an aperture structure, which can be metallic rings, metallic-enclosed apertures, or a metallic net.

Referring to FIGS. 2 to 6, the electron emitter 311 of one embodiment includes a carbon nanotube pipe. The length of the carbon nanotube pipe can be selected according to need. The cross section of the carbon nanotube pipe can be circular, ellipsoid, quadrangular, triangular, or polygonal. The carbon nanotube pipe includes a number of carbon nanotubes joined by van der Waals force. In one embodiment, the carbon nanotube pipe includes a number of successive and oriented carbon nanotubes. Most of the carbon nanotubes are helically oriented around an axis 307 of the carbon nanotube pipe. The carbon nanotube pipe may have a few carbon nanotubes not helically oriented around the axis 307, but oriented disorderly and randomly. The helically oriented carbon nanotubes are joined end-to-end by van der Waals force therebetween along a helically extending direction. An angle between the helically extending direction and the axis 307 can be greater than 0 degrees and less than or equal to 90 degrees. In one embodiment, the angle between the helically extending direction and the axis 307 is greater than or equal to 30 degrees and less than or equal to 60 degrees.

The electron emitter 311 is a carbon nanotube pipe including a first end 302, a second end 304 oriented to the first end 302, and a main body 309 connecting the first end 302 and the second end 304. The second end 304 is used as an electron emission portion. The second end 304 defines an opening 305 and includes a hollow neck portion 308 connected to the body 309. A number of carbon nanotube peaks 306 extend from a top of the hollow neck portion 308 around the opening 305 and are spaced from each other forming a ring shape. The diameter of the hollow neck portion 308 gradually decreases along a direction away from the first end 302 and forms a conical-shape. When an electric voltage is applied to the electron emitter 311, the electric field will be concentrated at the hollow neck portion 308 to help the electron emitter 311 emit electrons. Each of the carbon nanotube peaks 306 is a tapered carbon nanotube bundle and functions as an electron emitter. The carbon nanotube peaks 306 can extend along a same direction substantially parallel with the axis 307 or can extend outwardly at an angle from the axis 307. The carbon nanotube peaks 306 point to a direction away from the first end 302 of the electron emitter 311. The carbon nanotube peaks 306 can also extend along different directions across the axis 307 to form a radial shape. If the carbon nanotube peaks 306 form a radial shape, the size of the opening 305 of the second end 304 gradually increases where the neck portion 308 connects to the carbon nanotube peaks 306. The distance between two adjacent carbon nanotube peaks 306 gradually increases. Thus, the screening effect between the carbon nanotube peaks 306 is reduced. The effective diameter of the opening 305 where the neck portion 308 connects with the carbon nanotube peaks 306 can be in a range from about 4 micrometers to about 6 micrometers. In one embodiment, the opening 305 is round and has a diameter of about 5 micrometers.

Figure 7:
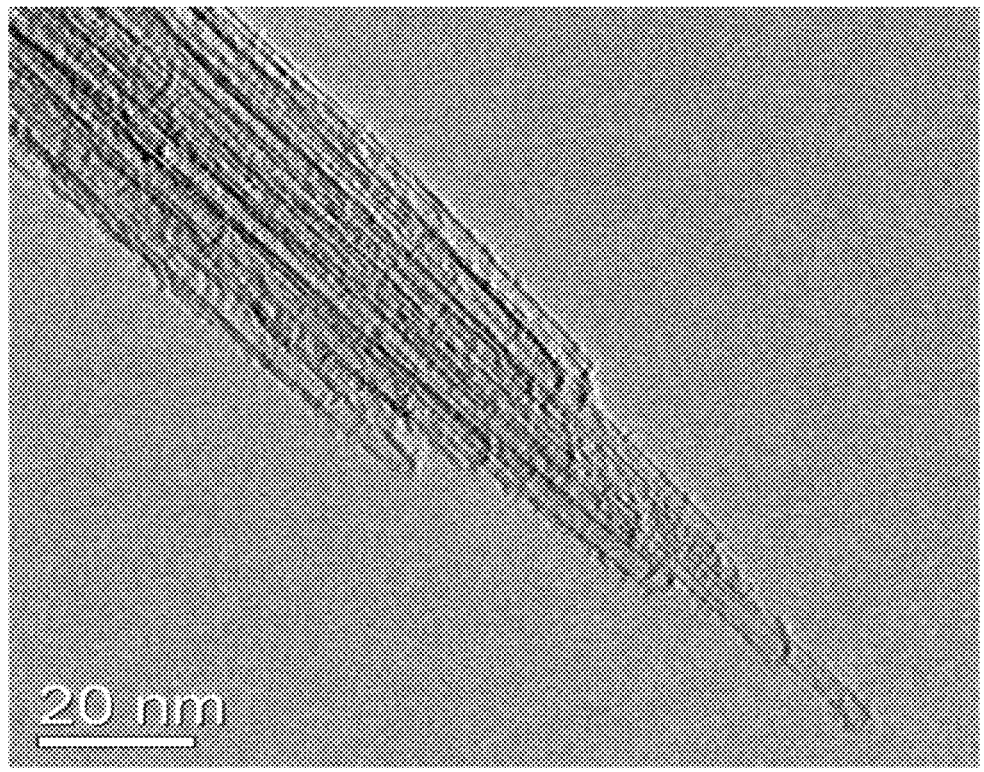
FIG. 7 is a transmission electron microscope (TEM) image of one embodiment of a carbon nanotube peak of an electron emitter.

Referring also to FIG. 7 the carbon nanotube peak 306 includes a number of carbon nanotubes substantially parallel to each other and joined by van der Waals force. A single projecting carbon nanotube is taller than and projects over other carbon nanotubes in the carbon nanotube peak 306. The single projecting carbon nanotube can be located within the middle of the other carbon nanotubes. The diameter of the carbon nanotubes is less than 5 nanometers, and the number of graphite layers of each carbon nanotube is about 2 to 3. In one embodiment, the diameter of the carbon nanotubes is less than 4 nanometers. Therefore, the aspect ratio of the carbon nanotubes in the carbon nanotube peaks and the field enhancement factor of the carbon nanotube peaks are increased. The field emission characteristics of the electron emitters 311 can be improved. The distance of the projecting carbon nanotubes of two adjacent carbon nanotube peaks 306 can be in a range from about 0.1 micrometers to about 2 micrometers. The ratio of the distance between the projecting carbon nanotubes and the diameter of the carbon nanotubes can be in a range from about 20:1 to about 500:1. Because the distance between the projecting carbon nanotubes is much greater than the diameter of the carbon nanotubes, the screening effect between the projecting carbon nanotubes is reduced. Because the electron emitters 311 include a number of carbon nanotube peaks 306, the electron density of the electron emitters 311 will be increased and the number of the electron emitters 311 can be reduced.

The carbon nanotube pipe can be formed by closely wrapping a carbon nanotube film or a carbon nanotube wire around the axis 307. The carbon nanotube film or carbon nanotube wire can be wrapped layer upon layer. The thickness of the wall of the carbon nanotube pipe can be determined by the number of the layers. The inner diameter and the outer diameter of the main body 309 of the carbon nanotube pipe can be selected according to need. The inner diameter of the carbon nanotube pipe can be in a range from about 10 micrometers to about 30 micrometers. The outer diameter of the carbon nanotube pipe can be in a range from about 15 micrometers to about 60 micrometers. In one embodiment, the inner diameter of the main body 309 of the carbon nanotube pipe is about 18 micrometers, and the outer diameter of the main body 309 of the carbon nanotube pipe is about 50 micrometers.

The electron emitter 311 can be applied to a field emission device such as a field emission display, an SEM, or a TEM. The field emission display has at least one cathode and at least one anode. The first end 302 of the electron emitter 311 can be connected to the cathode. The second end 304 of the electron emitter 311 points to the anode. When a voltage is applied between the electron emitter 311 and the anode, the electron emitter 311 can emit electrons under the voltage.

A method for making the electron emitter 311 includes the following steps:

S10, providing a linear support;

S20, providing at lease one carbon nanotube film or at least one carbon nanotube wire;

S30, wrapping the at lease one carbon nanotube film or wire around the linear support;

S40, removing the linear support to obtain a carbon nanotube hollow cylinder;

S50, fusing the carbon nanotube hollow cylinder.

In the step S10, the linear support is configured to support the at least one carbon nanotube film or wire. Thus the linear support should have a certain strength and toughness. The linear support can move forward along an axial direction of the linear support and rotate around the axial direction of the linear support simultaneously. In addition, the linear support should be easily removed by a chemical method or a physical method. The material of the linear support can be metal, alloy, or plastics. The metal can be gold, silver, copper, or aluminum. The alloy can be a copper-tin alloy. In one embodiment, the linear structure is a copper-tin alloy wire including about 97 wt. % copper and about 3 wt. % tin. In one embodiment, the linear support can be a gold thread having a diameter according to need. In one embodiment, the diameter of the gold thread is about 18 micrometers.

In the step S20, the at least one carbon nanotube film or wire can be a free-standing structure. The carbon nanotube film can be a drawn carbon nanotube film, a flocculated carbon nanotube film, a pressed carbon nanotube film, or a carbon nanotube film formed by spraying, coating, or deposition. The carbon nanotube film includes a number of carbon nanotubes distributed uniformly and attracted by van der Waals force therebetween. The carbon nanotubes in the carbon nanotube film can be orderly or disorderly aligned. The orderly aligned carbon nanotubes are arranged in a consistently systematic manner, e.g., most of the carbon nanotubes are arranged approximately along a same direction or have two or more sections within each of which the most of the carbon nanotubes are arranged approximately along a same direction (different sections can have different directions). The disorderly aligned carbon nanotubes are arranged along many different directions, such that the number of carbon nanotubes arranged along each different direction can be almost the same (e.g. uniformly disordered), and/or entangled with each other.

If the carbon nanotube film in the step S20 is a drawn carbon nanotube film or a carbon nanotube wire, the step S20 can further include the following substeps:

S210, providing a carbon nanotube array; and

S220, drawing a carbon nanotube film or a carbon nanotube wire from the carbon nanotube array.

In the step S210, the carbon nanotube array can be located on a substrate. The carbon nanotube array includes a number of carbon nanotubes. The number of carbon nanotubes in the carbon nanotube array can be approximately perpendicular to the substrate. The carbon nanotubes in the carbon nanotube array can be single-walled carbon nanotubes, double-walled carbon nanotubes, or multi-walled carbon nanotubes. The carbon nanotube array can be a super-aligned carbon nanotube array. The carbon nanotube array can be prepared by a chemical vapor deposition method, an arc discharge method, or a laser ablation method.

In the step S220, the carbon nanotube film can be formed by the substeps of:

S222, selecting one or more carbon nanotubes having a predetermined width from the super-aligned array of carbon nanotubes; and S224, pulling the carbon nanotubes to form carbon nanotube segments that are joined end to end at an uniform speed to achieve a uniform carbon nanotube film.

In step S222, the carbon nanotube segments having a predetermined width can be selected by using a tool such as an adhesive tape, tweezers, or a clamp to contact the super-aligned array.

In step S224, the pulling direction is substantially perpendicular to the growing direction of the super-aligned array of carbon nanotubes. Each carbon nanotube segment includes a number of carbon nanotubes substantially parallel to each other.

More specifically, during the pulling process, as the initial carbon nanotube segments are drawn out, other carbon nanotube segments are also drawn out end to end due to van der Waals force between ends of adjacent segments. This process of drawing ensures a substantially continuous and uniform carbon nanotube film having a predetermined width can be formed. The carbon nanotube film includes a number of carbon nanotubes joined ends to ends. The carbon nanotubes in the carbon nanotube film are all substantially parallel to the pulling/drawing direction of the carbon nanotube film, and the carbon nanotube film produced in such manner can be selectively formed to have a predetermined width. If the width of the carbon nanotube film is narrow enough, the carbon nanotube film can be used as the carbon nanotube wire.

In the step S30, a method for wrapping the at least one carbon nanotube film or wire around the linear support includes the following substeps:

S310, fixing one end of the carbon nanotube film or wire to the linear support; and S320, making a relative rotation between the linear support and the carbon nanotube film or wire, and simultaneously moving the linear support along an axial direction of the linear support.

During the step S320, an angle between the extending direction of the carbon nanotubes in the film or wire and the axial direction of the linear support can be greater than 0 degrees and less than 90 degrees. The carbon nanotube film or wire wrapping around the linear support forms a carbon nanotube layer. When the thickness of the carbon nanotube film or wire is predetermined, the greater the angle, the thicker the carbon nanotube layer. In one embodiment, the thickness of the carbon nanotube layer is about 6 micrometers.

The step S40 can be performed by a chemical method or a physical method, such as a mechanical method. If the linear support is made of an active metal or an alloy composed of active metals, such as iron or aluminum, the step S40 can include a step of reacting the linear support with an acid liquid. If the material of the linear support is an inactive metal or an alloy includes inactive metals, such as gold or silver, the step S40 can be performed by heating to evaporate. If the material of the linear support is a polymer material, the step S40 can include a step of pulling the linear support out from the carbon nanotube layer using a stretching device along the axial direction of the linear support. Therefore, the shape and effective diameter of the linear support can determine the figure and effective inner diameter of the carbon nanotube hollow cylinder. In one embodiment, the linear support is a gold thread. A method for removing the gold thread can include the following steps of connecting the two ends of the gold thread to two electrodes, applying a current to the gold thread by the two electrodes in a vacuum, and heating the gold thread until the gold thread is evaporated.

In one embodiment, after the step S30 and before the step S40, the carbon nanotube hollow cylinder can be treated by an organic solvent.

The carbon nanotube hollow cylinder includes a number of successive and oriented carbon nanotubes. Most of the carbon nanotubes are helically oriented around an axial direction of the carbon nanotube hollow cylinder. The helically oriented carbon nanotubes are joined end-to-end by van der Waals force therebetween along a helically extending direction. The carbon nanotube hollow cylinder may have a few carbon nanotubes not helically oriented around the axial direction, but oriented disorderly and randomly. The angle between the helically extending direction and the centerline of the carbon nanotube hollow cylinder can be greater than 0 degrees and less than or equal to 90 degrees.

In the step S50, the carbon nanotube hollow cylinder can be fused by laser scanning, electron beam irradiation, ion beam irradiation, heating by supplying a current, and/or laser-assisted fusing after supplying current.

If the carbon nanotube hollow cylinder is fused by heating by supplying a current, the step S50 can include the following substeps:

S512, placing the carbon nanotube hollow cylinder in a vacuum chamber or a chamber filled with inert gas; and S514, applying a voltage between two opposite ends of the carbon nanotube hollow cylinder, until the carbon nanotube hollow cylinder snaps at a certain point.

In the step S512, the vacuum chamber includes an anode and a cathode, which lead (i.e., run) from inside the vacuum chamber to outside the vacuum chamber. Two opposite ends of the carbon nanotube hollow cylinder are attached to and electrically connected to the anode and the cathode, respectively. The pressure of the vacuum chamber is less than $2 \times 10^{-5}$ Pascal (Pa). In one embodiment, the pressure of the vacuum chamber is about $2 \times 10^{-5}$ Pa.

The structure of the chamber filled with inert gas is the same as the vacuum chamber. The inert gas can be helium or argon.

In the step S514, the voltage depends on the inner diameter, outer diameter, and the length of the carbon nanotube hollow cylinder. In one embodiment, the carbon nanotube hollow cylinder is about 2 centimeters in length, about 25 micrometers in the inner diameter, and about 40 micrometers in the outer diameter, and a 40 V direct current (DC) voltage applied. Consequently, the carbon nanotube hollow cylinder is heated by Joule-heating, and a temperature of the carbon nanotube hollow cylinder can reach an range from about 2000 Kelvin (K) to about 2400 K. The resistance along the longitudinal axial of the carbon nanotube hollow cylinder is different, and thus the temperature distribution along the longitudinal axial of the carbon nanotube hollow cylinder is different. The greater the resistance and higher the temperature, the more easily it snaps. In one embodiment, after less than 1 hour (h), the carbon nanotube hollow cylinder snaps at a certain point to form two carbon nanotube pipes.

During snapping, some carbon atoms vaporize from the snapping portion of the carbon nanotube hollow cylinder. Each snapped carbon nanotube hollow cylinder has a break-end portion. The closer to the snapping position, the more carbon atoms are evaporated. Therefore, the neck portion is formed on the break-end portion of the snapped carbon nanotube hollow cylinder. After snapping, a micro-fissure is formed between the two break-ends, arc discharge may occur between the micro-fissure, and the carbon atoms are transformed into carbon ions due to ionization. These carbon ions bombard or etch the break-end portion to form a number of carbon nanotube peaks 306. A wall by wall breakdown of carbon nanotubes is caused by the Joule-heating at a temperature higher than 2000K. The carbon nanotubes at the broken ends have smaller diameters and a fewer number of graphite layers.

If the carbon nanotube hollow cylinder is fused by the electron emitter bombarding method, the S50 can include the following substeps:

S522, putting the carbon nanotube hollow cylinder in a vacuum chamber;

S524, applying a voltage between two opposite ends of the carbon nanotube hollow cylinder and heating the carbon nanotube hollow cylinder to a temperature of about 1800K to about 2500K; and S526, bombarding a predetermined point of the carbon nanotube hollow cylinder by an electron beam until the carbon nanotube hollow cylinder snaps.

In the step S522, the pressure of the vacuum chamber is less than $1 \times 10^{-4}$ Pascal (Pa). In one embodiment, the pressure of the vacuum chamber is about $1 \times 10^{-5}$ Pa.

In the step S526, the electron beam can be emitted by an electron source, such as a carbon nanotube wire, a hot cathode, or any other field emission electron sources. A number of electron sources can be used together to obtain a larger electron current. The electron source is used to bombard a predetermined point of the carbon nanotube hollow cylinder. The predetermined point is located along the longitudinal axis of the carbon nanotube hollow cylinder. The electron source is arranged in the vacuum chamber. A distance between the electron source and the carbon nanotube hollow cylinder is in an approximate range from 50 micrometers to 2 millimeters (mm), typically about 50 micrometers. The electron source can be in any direction, only if the electron source can bombard the predetermined point. With electron bombarding, a temperature of the predetermined point is enhanced, and thus the temperature thereof is higher than the other points along the longitudinal axis of the carbon nanotube hollow cylinder. Consequently, the carbon nanotube hollow cylinder previously snaps at the predetermined point, and then two electron emitters 311 are formed.

If the carbon nanotube hollow cylinder is fused by the laser beam, the S50 can include the following substeps:

S532, irradiating a predetermined point of the carbon nanotube hollow cylinder with a laser beam; and S534, applying a voltage between two opposite ends of the carbon nanotube hollow cylinder, until the carbon nanotube hollow cylinder snaps.

In the step S532, the carbon nanotube hollow cylinder can be exposed to a gas, such as air or oxidizing gas.

The laser beam can be a carbon dioxide laser, semiconductor laser, UV laser, or any other laser. A power of the laser beam is in a range from about 1 watt to about 12 watts, and a scanning velocity thereof is in a range from about 100 mm/s to about 2000 mm/s In one embodiment, the power of the laser beam is about 12 watts, and the scanning velocity thereof is about 1000 mm/S The greater the power of the laser beam, the shorter the time the laser beam irradiates the carbon nanotube hollow cylinder.

In the step S534, the carbon nanotube hollow cylinder can be placed in a vacuum chamber or a chamber filled with inert gas. Due to the heat of the laser beam, the carbon nanotube hollow cylinder is oxidized at the predetermined point, with some defects formed thereat, and thus the resistance at the predetermined point increases. The greater the resistance and higher the temperature, the more easily it snaps. The carbon nanotube hollow cylinder will be snapped at the predetermined point.

The step S532 and the step S534 can be implemented simultaneously when the carbon nanotube hollow cylinder is placed in a vacuum chamber or a chamber filled with inert gas.

The above-described method for making the electron emitter 311 is simple and the efficiency of making the electron emitter 311 can be improved. By the provision of the carbon nanotube peaks formed on the break-end of the carbon nanotube pipe, the field emission characteristic of the carbon nanotube pipe is improved.

Figure 8:
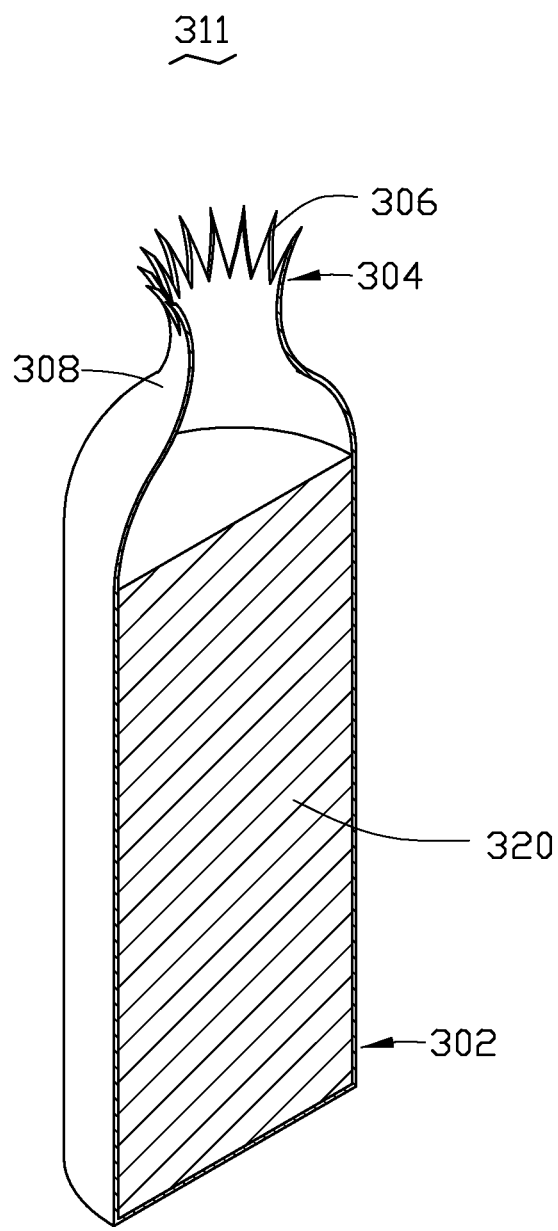
FIG. 8 is schematic structural view of one embodiment of an electron emitter.

Referring to FIG. 8, the electron emitter 311 of one embodiment can be a carbon nanotube linear compound. The carbon nanotube linear compound includes a conductive linear support 320 and a carbon nanotube pipe. The carbon nanotube pipe includes a first end 304 and a second end 302. The first end 304 of the carbon nanotube pipe includes a hollow neck portion 308 and a number of carbon nanotube peaks 306 extending from a top of the hollow neck portion 308. The conductive linear support 320 is located in the carbon nanotube pipe and encased by the carbon nanotube pipe. The length of the conductive linear support 320 can be shorter than that of the carbon nanotube pipe. The conductive linear support 320 can also extend out of the carbon nanotube pipe from the second end 302.

The conductive linear support 320 supports the carbon nanotube pipe and improves the electric conductivity of the electron emitter 311. Therefore, field emission characteristic of the electron emitter 311 is improved. The conductive linear support 320 can be made of conductive material. The conductive linear support 320 can be made of metal, alloy, or a linear structure coating a layer of conductive material. The metal can be gold, silver, copper, or aluminum. In one embodiment, the linear support is a gold thread. The diameter of the conductive linear support 320 can be in a range from about 10 micrometers to about 30 micrometers. In one embodiment, the conductive linear support 320 is a metal wire and the diameter of the metal wire is about 18 micrometers.

If the electron emitter 311 is a carbon nanotube linear compound, a method for making the electron emitter 311 includes the following steps:

S100, providing a conductive linear support;

S200, providing at lease one carbon nanotube film or wire;

S300, wrapping the at lease one carbon nanotube film or wire around the conductive linear support to form a carbon nanotube linear compound; and S400, fusing the carbon nanotube linear compound.

The method for making the electron emitter 311 in FIG. 8 is similar to the method for making the electron emitter 311 in FIG. 2. The method for wrapping the at lease one carbon nanotube film or wire and the fusing method are identical between the two methods for making the electron emitters 311 previously described. The difference is that the linear support for making the electron emitter 311 can be made of insulated material but the conductive linear support is used to make the electron emitter 311. Furthermore, the conductive linear support cannot be removed before the fusing step in the method for making the electron emitter 311.

The melting point of the carbon nanotube pipe and the conductive linear support may be different. During the fusing process, the carbon nanotube pipe and the conductive linear support are heated to a very high temperature. If the melting point of the carbon nanotube pipe is lower than that of the conductive linear support, the carbon nanotube pipe will first snap at a predetermined point under the current, the laser, or electron beams. After the carbon nanotube pipe has snapped, the resistance of the conductive linear support corresponding to the snapped point of the carbon nanotube pipe will be raised. The greater the resistance, the higher the temperature. Therefore, the carbon nanotube pipe and the conductive linear support will snap at the same point. It can be understood that if the melting point of the conductive linear support is lower than that of the carbon nanotube pipe, the conductive linear support and the carbon nanotube pipe can also be snapped at the same point.

The method for making the electron emitter 311 has the following benefits. First, the method for making electron emitter 311 is simple and the efficiency of making the electron emitter 311 can be improved. Second, the carbon nanotube peaks are formed on one end of the carbon nanotube pipe, therefore the field emission characteristic of the electron emitter 311 is improved. A conductive linear structure is located in the interior of the carbon nanotube pipe to support the carbon nanotube pipe. The electric conductivity of the electron emitter 311 is improved for the conductive linear structure.

The shield electrode 32 provides the receiving space 320 where the electrons are vibrated. The cross section of the shield electrode 32 can be circular, ellipsoid, square, or other shapes. The shield electrode 32 is made of conductive material. The shield electrode 32 is a gold film positioned on a portion of the inner surface of the shell 38. In one embodiment, a diameter of the shield electrode 32 is about 18 millimeters, and a length is about 18 millimeters. The shape of the shell 38 can correspond to the shape of the shield electrode 32.

The electron induct electrode 37 induces the electrons into the shield electrode 32. The electron induct electrode 37 generally covers the first opening of the shield electrode 32, and is electrically insulated from the shield electrode 32. The electron induct electrode 37 is annular. The edge of the electron induct electrode 37 can be fastened on an inner surface of the shell 38.

The anode ring 33 is fastened in the receiving space 320 of the shield electrode 32 by a supporting rod (not labeled). An externally sourced voltage is applied to the anode ring 33. In order to form a symmetrical electrical field, the anode ring 33 can be positioned in a middle of the shield electrode 32, and is electrically insulated from the shield electrode 32. In general, the anode ring 33 is a wire. A diameter of the anode ring 33 is about 9 millimeters. In one embodiment, a diameter of the wire is about 200 micrometers.

The ion educed electrode 34 generally covers the second opening of the shield electrode 32, and is electrically insulated from the shield electrode 32. The ion educed electrode 34 is annular. A diameter of the electron induct hole 371 is the same as that of the ion educed hole 341.

The reflector 35 surrounds the second opening of the shield electrode 32, and is electrically insulated from the ion educed electrode 34. In one embodiment, the reflector 35 is hemispherical, and a diameter thereof is about 18 millimeters. The ion educed hole 341 is positioned in a center portion of the reflector 35. A small opening (not labeled) is defined in the center portion of the reflector 35, for holding the collector 36.

The collector 36 is generally a wire, and is kept electrically insulated from the reflector 35. In one embodiment, a diameter of the wire is about 200 micrometers. A majority of the collector 36 is enclosed by the reflector 35 and a tip of the collector 36 is aimed at the ion educed hole 341. If the vacuum ionization gauge 30 has no reflector 35, then the collector 36 is oriented to the shield electrode 32. The anode ring 33, ion educed electrode 34, and reflector 35 are all axially aligned along an axis of the shield electrode 32.

In use, different voltages are applied to the shield electrode 32, anode ring 33, collector 36, and reflector 35. For example, the shield electrode 32 is grounded, about 1 kilovolt is applied to the anode ring 33 to form a symmetrical electric field in the shield electrode 32, the voltage of the collector 36 is zero, and the voltage of the reflector 35 is positive. Furthermore, the voltage of the grid electrode 316 of the cold cathode 31 is positive to avoid electrons being attracted by the collector 36, and the voltages of the electron induct electrode 37 and the ion educed electrode 34 are determined according to need.

An operating process of the vacuum ionization gauge 30 is described as follows. First, the field emission unit 314 emits electrons into the shield electrode 32 via the electron induct hole 371. Second, the electrons vibrate in the symmetrical electric field, and collide with gas molecules and ionize the gas molecules to form an ion current. Third, the ion current moves out of the shield electrode 32 via the ion educed hole 341, and the ions are collected by the collector 36 to form a current signal of the collector 36. The current is directly proportional to a vacuum pressure in the vacuum ionization gauge 30. Therefore, the vacuum pressure in the vacuum ionization gauge 30 can be measured according to this relation.

The electron emitters 311 of the cold cathode 31 include a carbon nanotube pipe and a number of carbon nanotube peaks extending from one end of the carbon nanotube pipe. Therefore, the field emission characteristic of the electron emitters 311 is superior. Furthermore, a low voltage is needed to be applied to the grid electrode 316 to attract electrons from the electron emitters 311, and the attractive force that the grid electrode 316 applies to the electrons in the shield electrode 32 will be low. The route of the electrons in the shield electrode 32 will be long and the electrons in the shield electrode 32 can collide with gas molecules to ionize the gas molecules. The sensitivity of the vacuum ionization gauge 30 is thereby improved.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A vacuum ionization gauge comprising:
a cold cathode comprising a field emission unit and a grid electrode corresponding to the field emission unit, the field emission unit comprising a carbon nanotube pipe, the carbon nanotube pipe having a first end, a second end and a main body connecting the first end to the second end, the second end having a plurality of carbon nanotube peaks;
a shield electrode defining a receiving space, a first opening, and a second opening, wherein the first opening of the shield electrode is oriented to the cold cathode;
an anode ring located in the receiving space of the shield electrode; and
a collector oriented to the second opening of the shield electrode.

2. The vacuum ionization gauge of claim 1, wherein the cold cathode further comprises a substrate connected to the first end of the carbon nanotube pipe.

3. The vacuum ionization gauge of claim 1, wherein the carbon nanotube pipe comprises a plurality of carbon nanotubes surrounding an axis of the carbon nanotube pipe.

4. The vacuum ionization gauge of claim 1, wherein the second end defines an opening and comprises a hollow neck portion connected to the main body.

5. The vacuum ionization gauge of claim 4, wherein the plurality of carbon nanotube peaks extends from a top of the neck portion around the opening.

6. The vacuum ionization gauge of claim 1, wherein the plurality of carbon nanotube peaks is located around an axis of the carbon nanotube pipe, spaced apart from each other to form a ring shape, and pointing towards the anode electrode.

7. The vacuum ionization gauge of claim 6, wherein the plurality of carbon nanotube peaks extends along a same direction substantially parallel with the axis.

8. The vacuum ionization gauge of claim 6, wherein the carbon nanotube peaks extend away from a top of the neck portion at an angle from the axis to form a radial shape.

9. The vacuum ionization gauge of claim 1, wherein each of the plurality of carbon nanotube peaks comprises a plurality of carbon nanotubes substantially parallel to each other and joined by van der Waals force.

10. The vacuum ionization gauge of claim 9, wherein each of the plurality of carbon nanotube peaks is a tapered carbon nanotube bundle, and a single projecting carbon nanotube is taller than and projects over other carbon nanotubes in each of the plurality of carbon nanotube peaks.

11. The vacuum ionization gauge of claim 10, wherein the single projecting carbon nanotube is located in a middle of the other carbon nanotubes.

12. The vacuum ionization gauge of claim 10, wherein a distance of the projecting carbon nanotubes of two adjacent carbon nanotube peaks is in a range from about 0.1 micrometers to about 2 micrometers.

13. The vacuum ionization gauge of claim 10, wherein the carbon nanotube pipe comprises a plurality of successive carbon nanotubes helically oriented around the axis of the carbon nanotube pipe, and joined end-to-end by van der Waals force therebetween along a helical extending direction.

14. The vacuum ionization gauge of claim 1, wherein the field emission unit further comprises a conductive linear support located in and encased by the carbon nanotube pipe.

15. The vacuum ionization gauge of claim 1, further comprising an ion educed electrode positioned between the shield electrode and the collector, wherein an ion educed hole is defined in a middle of the ion educed electrode.

16. The vacuum ionization gauge of claim 1, further comprising an electron induct electrode positioned between the cold cathode and the shield electrode, wherein an electron induct hole is defined in a middle of the electron induct electrode, and the field emission unit is aimed at the electron induct hole.

17. The vacuum ionization gauge of claim 1, further comprising a reflector surrounding the second opening of the shield electrode.

18. The vacuum ionization gauge of claim 1, further comprises a shell, wherein the cold cathode, the shield electrode, the anode ring and the collector are received in the shell.

19. A vacuum ionization gauge comprising:
a cold cathode comprising a field emission unit and a grid electrode corresponding to the field emission unit;
a shield electrode defining a receiving space, a first opening, and a second opening,
an anode ring located in the receiving space of the shield electrode; and
a collector corresponding to the second opening of the shield electrode, wherein the field emission unit comprises a carbon nanotube pipe, the carbon nanotube pipe comprises two ends and a main body connecting to the two ends, one end of the carbon nanotube pipe defines an opening and comprises a plurality of tapered carbon nanotube bundles located around the opening, and the first opening of the shield electrode is positioned corresponding to the cold cathode.

20. A vacuum ionization gauge comprising:
a cold cathode comprising a field emission unit and a grid electrode corresponding to the field emission unit;
a shield electrode defining a receiving space, a first opening, and a second opening;
an anode ring located in the receiving space of the shield electrode; and
a collector corresponding to the second opening of the shield electrode, wherein the field emission unit comprises a carbon nanotube pipe, the carbon nanotube pipe has one end comprising a plurality of tapered carbon nanotube bundles located around an axis of the carbon nanotube pipe and spaced apart from each other to form a ring shape, and the first opening of the shield electrode is positioned corresponding to the cold cathode.

* * * * *